United States Patent Office 3,412,345
Patented Nov. 19, 1968

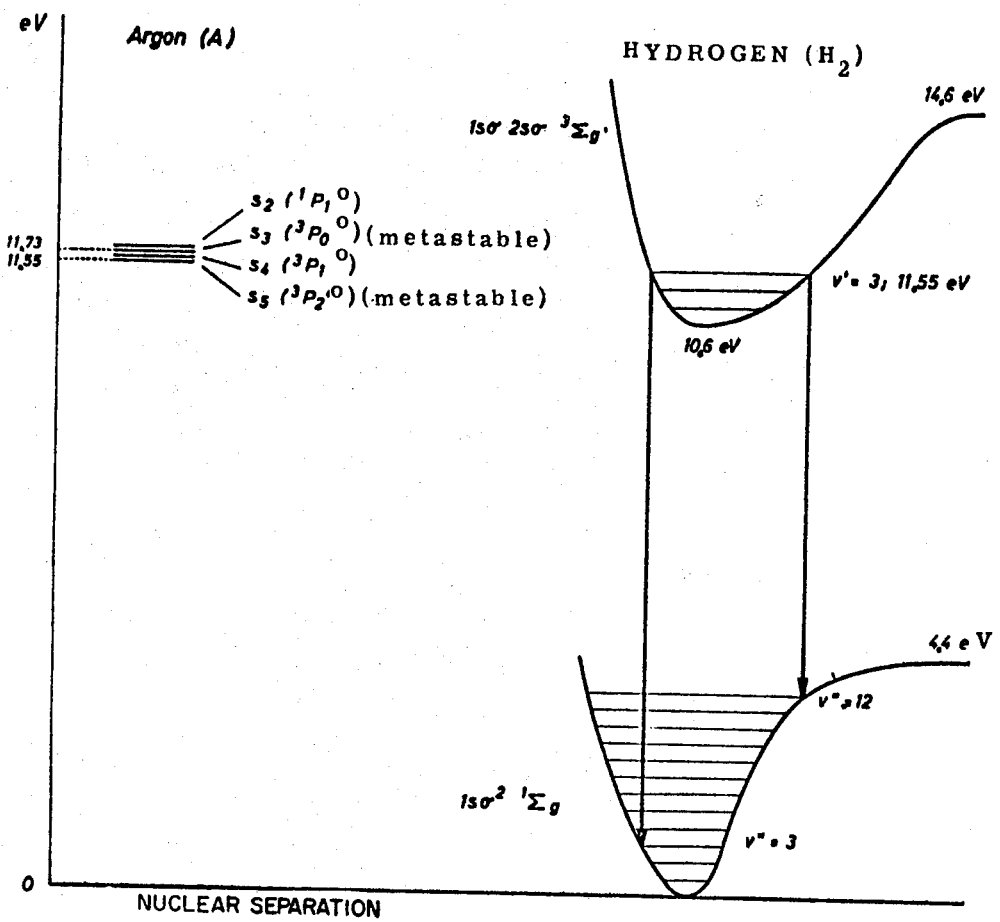

3,412,345
NOBLE GAS-HYDROGEN LASER
Wolfgang K. Friedl, Hanau am Main, and Volker Schaefer, Bruchkoebel, near Hanau, Germany, assignors to Quarzlampengesellschaft m.b.H., Hanau am Main, Germany
Filed Aug. 4, 1965, Ser. No. 477,261
Claims priority, application Germany, Aug. 19, 1964, Q 796
7 Claims. (Cl. 331—94.5)

ABSTRACT OF THE DISCLOSURE

Optical maser apparatus having as its optical medium a gas mixture including a noble gas and up to about one percent hydrogen, said mixture being maintained at pressures in the range of 1 to 100 torr.

Cross reference to related application

In a related co-pending United States patent application Ser. No. 477,286, filed Aug. 4, 1965, a noble gas-nitrogen laser is disclosed. That disclosure, the prior art cited therein, and the prior art cited herein, are to be considered as incorporated into the present disclosure by reference, insofar as pertinent hereto.

Background of the invention

The present invention generally pertains to an improvement in communication systems, employing means to abstract electro-magnetic energy, to provide for escape of substantially coherent electro-magnetic radiation and for light amplification by stimulated emission of radiation.

More particularly, the present invention pertains to an optical transmitter or amplifier which uses gases as the negative temperature fluorescent media for coherent radiation, particularly in the vacuum-ultraviolet range.

The prior art of interest to the present disclosure is represented by U.S. Patent No. 2,929,922 to Shawlov et al., describing a conventional maser type apparatus, and by an article by W. R. Bennett, Jr., in Applied Optics, Supplement on Chemcial Lasers, 1965.

Summary of the invention

The primary object of the present invention is to provide an optical transmitter or amplifier employing as the gaseous mixture argon with up to about 1% hydrogen.

To differentiate the present disclosure from the above and to provide antecedent technical terminology for the present disclosure and claims, the present system hereinafter will be referred to as noble gas-hydrogen laser.

Another object of the present invention is to employ a noble gas-hydrogen mixture under certain preferred gas pressures related to selected dimensions of a discharge chamber for optimum results.

A further object of the invention is to provide a system of the type described with controlled ratios of selected dimensions of the excitation chamber with noble gas pressures to decrease the instances, of inelastic collisions with the wall of the chamber and it is to be prevented that the excited noble gas atoms revert to their basic state without emitting radiation.

Another object of the invention is to provide a noble gas-hydrogen laser for radiation in the range of between about 1.200 to 1.700 A. units.

A still further object of the invention is to provide an optical system of the character described by subjecting the gaseous mixture to a pressure of between about 10 to 100 torr.

Another object of the invention is to provide the system described with a discharge tube having a diameter between about 1–30 mm. correlated in ratio with the pressure employed.

Still another object of the invention is to provide the system of the type described under selective excitation of the hydrogen molecule at the metastable argon level $s_5(^3P_2^o)$.

Other objects and many additional advantages of the invention will become apparent to those skilled in the art from the following specification, drawings and claims.

Brief description of the drawing

The only figure of drawings is a diagrammatic plot of levels for the energy transfer system of argon.

Description of the preferred embodiment

In accordance with the present invention, the reversal of the normal distribution of population energy level prerequisite to the production of a coherent, directional radiation is accomplished with a noble gas-hydrogen mixture under the following considerations. In the noble gas-hydrogen mixture the hydrogen molecules are present only in a very low concentration and the probability of collisions between the free electrons and the hydrogen molecules is very small. On the other hand, the free electrons preferably collide elastically with the noble gas atoms until the kinetic energy of the electrons is sufficiently high to excite the lowest noble gas energy levels. The noble gas atoms thus excited then transmit their excitation energy preferably by secondary collisions to the hydrogen molecules, if the noble gas pressure and the dimensions of the chamber are selected in proportions tending to avoid, as much as possible, inelastic collisions with the wall in favor of inelastic collisions with the hydrogen molecules. Thus the present invention, while avoiding these collisions with the wall of the chamber, also avoids that the excited noble gas atoms revert to their basic state without emitting radiation.

While the invention pertains to the group of noble gases, argon has been selected as the species for this disclosure. In the drawings the energy transfer system is exemplified for argon in the diagrammatic plot of levels shown. By transfer of energy from the excited argon atoms to the hydrogen molecules, a single level of oscillation is selected from the large train of oscillation levels of the excited state $1s\sigma\ 2s\sigma\ ^3\Sigma_g$ of the hydrogen molecule, namely the one wherein $v'=3$ which permits the transitions to the state $1s\sigma^2\ ^1\Sigma_g$ pertaining to $v''=3$ to $v''=12$ with the occurrence of the corresponding band train. This band train represents the so-called simplified Lyman bands.

As the $1s\sigma^2\ ^1\Sigma_g$-state represents the electron basic state of the hydrogen molecule, the selective excitation mechanism together with the participation of the excited argon atoms does not insure yet a reversal of the normal population distribution of energy levels. However, consideration being given to the fact that oscillation levels having oscillation quantum numbers $v''$ larger than under normal conditions are barely occupied in a gas discharge, the present invention recognized that for all transitions to $v''=3$ the condition of reversal of the normal population distribution level must be fulfilled.

In the following table the Deslandres diagram of spectral band systems of the Lyman bands (zero lines) is shown schematically. In the table the underlined line (3) lists the wave lengths in A. of the preferred emissions:

| $v'/v''$ | 3 | 4 | 5 | 6 | 7 | 8 | 9 | 10 | 11 | 12 |
|---|---|---|---|---|---|---|---|---|---|---|
| 0 | 1,275.17 | 1,334.21 | 1,394.55 | 1,455.80 | 1,517.29 | 1,578.28 | 1,637.47 | | | |
| 1 | 1,254.00 | 1,311.06 | 1,369.34 | 1,428.37 | 1,487.54 | 1,546.03 | 1,602.90 | 1,656.56 | | |
| 2 | 1,234.10 | 1,289.43 | 1,345.75 | 1,492.68 | 1,459.71 | 1,515.98 | 1,570.59 | 1,622.19 | 1,669.20 | |
| 3 | 1,215.32 | 5,268.97 | 1,323.44 | 1,378.47 | 1,433.34 | 1,487.63 | 1,540.38 | 1,589.98 | 1,635.11 | |
| 4 | | 1,249.64 | 1,302.49 | 1,355.86 | 1,408.89 | 1,461.39 | 1,512.06 | 1,559.89 | 1,603.26 | 1,640.50 |
| 5 | | | 1,282.74 | 1,334.35 | 1,385.85 | 1,436.53 | 1,485.25 | 1,531.58 | 1,573.34 | 1,609.19 |
| 6 | | | 1,264.06 | | 1,364.14 | 1,413.31 | 1,460.64 | 1,505.10 | 1,545.43 | 1,579.87 |

Note.—$v'$ represents the oscillation quantum number of the higher electron level. $v''$ represents the oscillation quantum number of the lower electron level.

In the Deslandres diagrams, only the wave lengths are set forth, in Angstrom units, but not the wave number differences.

As a rule any conventional discharge device may be utilized by those skilled in the art for excitation as long as a discharge tube of a diameter of between about 1 to 30 mm. is employed at a pressure of between about 1 to 100 torr.

While the present disclosure exemplifies only a preferred embodiment of the invention, various changes and alterations thereof may be made without departing from the scope and spirit of what is claimed.

What is claimed is:

1. In optical transmitter and amplifier systems including a noble gas-hydrogen laser of the type employing gases as the negative temperature selectively fluorescent media for producing coherent radiation preferably in the vacuum ultraviolet range, the improvement comprising a gaseous mixture of up to about 1 percent hydrogen molecule with a noble gas.

2. The optical system as claimed in claim 1, wherein said noble gas is argon.

3. The optical system as claimed in claim 1, further including means to keep said noble gas under pressure of between about 1 to 100 torr.

4. The optical system as claimed in claim 1, further comprising a discharge tube having a diameter between about 1 to 30 mm.

5. The optical system as claimed in claim 1, comprising means to excite selectively the hydrogen molecule at the metastable argon level $s_5(^3P_2^o)$.

6. The optical system as claimed in claim 1, further comprising a discharge tube having a diameter between about 1 to 30 mm., said noble gas being argon, means to pressurize the gaseous mixture at between about 1 to 100 torr, and means to excite selectively the hydrogen molecule at the metastable argon level $s_5(^3P_2^o)$.

7. In a method of transmitting or amplifying light to abstract electro-magnetic wave energy providing for escape of substantially coherent electro-magnetic radiation preferably in the vacuum-ultra-violet range by a noble gas-hydrogen laser, the steps of: introducing into a discharge tube having a diameter between about 1 to 30 mm. a noble gas, of admixing thereto up to about 1 percent hydrogen molecule, of pressurizing the gaseous mixture at about 1 to 100 torr, and of exciting selectively the hydrogen molecule at the metastable level of said gas $s_5(^3P_2^o)$.

References Cited

UNITED STATES PATENTS 3,278,858   10/1966   Faust et al. _____ 331—94.5

OTHER REFERENCES

Chebotayer: "Effect of Hydrogen and Oxygen on the Operation of a Neon Maser," Radio Engineering and Electronic Physics, vol. 10, pp. 316–318, February 1965.

JEWELL H. PEDERSEN, *Primary Examiner.*

E. BAUER, *Assistant Examiner.*